United States Patent
Lee et al.

(10) Patent No.: US 12,064,713 B2
(45) Date of Patent: Aug. 20, 2024

(54) FEED DILUTION APPARATUS FOR THICKENER/CLARIFIERS

(71) Applicant: FLSmidth A/S, Valby (DK)

(72) Inventors: Joon Won Lee, Salt Lake City, UT (US); Thien Sok, Sandy, UT (US); Fred Schoenbrunn, Cottonwood Heights, UT (US); Brian Pliska, Midvale, UT (US); Muthu Srinivasan, Midvale, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 18/274,208

(22) PCT Filed: Jan. 25, 2022

(86) PCT No.: PCT/IB2022/050652
§ 371 (c)(1),
(2) Date: Jul. 25, 2023

(87) PCT Pub. No.: WO2022/157748
PCT Pub. Date: Jul. 28, 2022

(65) Prior Publication Data
US 2024/0091675 A1 Mar. 21, 2024

Related U.S. Application Data

(60) Provisional application No. 63/257,946, filed on Oct. 20, 2021, provisional application No. 63/141,182, filed on Jan. 25, 2021.

(51) Int. Cl.
*B01D 21/24* (2006.01)
*B01F 23/50* (2022.01)
*B01F 35/71* (2022.01)

(52) U.S. Cl.
CPC ..... *B01D 21/2427* (2013.01); *B01D 21/2405* (2013.01); *B01D 21/2433* (2013.01);
(Continued)

(58) Field of Classification Search
CPC ............ B01D 21/0018; B01D 21/2427; B01D 21/2405; B01D 21/2433; B01D 21/2444;
(Continued)

(56) References Cited

U.S. PATENT DOCUMENTS

2011/0100931 A1 5/2011 Lake et al.
2018/0133622 A1 5/2018 Cook et al.

FOREIGN PATENT DOCUMENTS

CN 207877353 U 9/2018

OTHER PUBLICATIONS

International Search Report and Written Opinion dated Apr. 29, 2022, 11pages.

*Primary Examiner* — Bradley R Spies
*Assistant Examiner* — Jeannie McDermott
(74) *Attorney, Agent, or Firm* — Jeffrey A. Sharp

(57) ABSTRACT

A feedwell assembly (1) having a feedwell (3) and feed dilution apparatus (27) is characterised in that the feed dilution apparatus (27) includes a centrifugal impeller (16) arranged within a pump housing (9). The pump housing is arranged below a weir box (12) having an upper opening and a spill lip (12b). The spill lip (12b) is arranged at an upper periphery of the weir box (12). The spill lip (12b) is configured to be arranged below an air-liquid interface (20) during operation such that there is a depth of submergence (26) between the spill lip (12b) and the air-liquid interface (20).

18 Claims, 11 Drawing Sheets

(52) U.S. Cl.
CPC ..... *B01D 21/2444* (2013.01); *B01D 21/2488* (2013.01); *B01F 23/581* (2022.01); *B01F 35/71725* (2022.01); *B01F 35/7176* (2022.01)

(58) Field of Classification Search
CPC ............... B01D 21/2488; B01F 23/581; B01F 35/71725; B01F 35/7176
See application file for complete search history.

FEED DILUTION APPARATUS FOR THICKENER/CLARIFIERS

FIELD OF THE INVENTION

The present invention relates to feed dilution apparatus for use within thickener/clarifier systems in the field of sedimentation. More particularly, the present invention relates to a centrifugal-type pump apparatus located upstream of a feedwell, which draws in clarified liquor and solids entrained in froth adjacent a water air interface, and combines the same with infeed slurry being delivered to the feedwell.

BACKGROUND TO THE INVENTION

Reference to background art herein is not to be construed as an admission that such art constitutes common general knowledge in the arts.

Feedwells have been known to be used within sedimentation units (e.g., thickener/clarifiers) for decades. The purpose of a feedwell is generally to reduce momentum, energy, and velocities associated with incoming feed slurry, such that quiescent settling zones may be maintained within the main settling tank regions of the thickener/clarifier.

Dilution of the infeed slurry within or upstream of a feedwell may be enabled through the use of a conventional feed dilution system. Some examples of such prior apparatus and methods may be found in WO2010097762A1, WO2012071256A1, WO2012082530A1, WO2013096967A1, WO2014089433A1, US20140175020A1, US2018/133622A1, U.S. Pat. Nos. 5,389,250A, 7,988,865B2, WO2003095062A1, CN 207877353U, AU2007100006, and AU2008100050.

FLSmidth's E-DUC® and P-DUC feed dilution systems serve to maximise flocculation efficiency and settling rates, but do not adequately address froth build-up. Current P-DUC apparatus utilize an axial pump and submerged shroud having an open lower floor. The axial pump sucks up clarified liquor from upper strata within a thickener and a vertically upward direction. The clarified liquor received by the axial pump is taken well-below an air-liquid interface, thus potentially compromising quiescent zones within the thickener. The clarified liquor is naturally admixed with incoming slurry via eduction before introduction into a generally horizontally-arranged mixing conduit of a feedwell. Due to its lower opening configuration, the P-DUC design may disrupt quiescent zones within the thickening tank and may not adequately address froth/foam having entrained solids therein that can form adjacent an air-liquid interface and overflow the clarified liquor weir as product overflow. Froth buildup within sedimentation units remains an industry-wide problem. Accordingly, there has been a long-felt need to address froth buildup in thickener/clarifiers and ensure that all solids exit the circuit as underflow and that clarified liquid products remain free of solids.

Similarly, Outotec's Autodil™, Directional Autodil™, and Turbodil™ forced feed dilution system have each been employed to dilute feed slurry, but these systems also do not adequately address froth build-up and overflow product contamination.

During sedimentation operations, solids can become entrained in a swirling froth at the upper air-liquid interface of a thickener/clarifier. Accordingly, solids meant to be settled can short circuit the process by flowing over the clarified phase weir, thus leading to contaminations of clarified product streams and/or reductions in overall settler efficiency. It is, therefore, desirable to provide a more robust feed dilution system which is configured to re-introduce these floating solids with infeed slurry-so that they have an additional opportunity(ies) to settle to a lower tank outlet without contaminating upper clarified product phases.

Related devices have been proposed, which aim to break up froth (e.g., US20110067568A1) or deaerate feed (e.g., US20140352529A1). However, such devices do not largely contribute to or assist dilution of feed slurry.

Embodiments of the present invention aim to improve upon existing forced dilution systems by incorporating a centrifugal-type impeller fed from above by a shallowly-submerged receptacle. In this regard, infeed slurry may be diluted and froth-entrained solids may be simultaneously removed from clarified phases and re-introduced to the feedwell for settling.

OBJECTS OF THE INVENTION

It is an aim of embodiments to provide an improved feed dilution apparatus for sedimentation equipment (e.g., a thickener/clarifier or sedimentation tank) which overcomes or ameliorates one or more of the disadvantages or problems described above; or, which at least provides a useful alternative to conventional feed dilution systems.

It is a further aim of embodiments to provide a feed dilution apparatus which exhibits an improved ability to remove froth from upper clarified phases and/or re-introduce froth-entrained solids back into the feedwell and sedimentation process to encourage settling thereof.

It is a further aim of embodiments to provide a feed dilution apparatus which reduces or at least discourages the formation of froth on liquid surfaces of concentrate thickeners during operation.

It is a further aim of embodiments to provide a feed dilution apparatus which is configured to utilize shear (e.g., shear rate of liquids flowing along a weir box sidewall or into a pump housing comprising a rotating centrifugal impeller) to help break down froth received from an air-liquid interface.

It is a further aim of embodiments to provide a feed dilution apparatus which is configured to tailor flow velocities entering the feedwell for optimal flocculation.

It is a further aim of embodiments to provide a feed dilution apparatus which is configured to tailor proper mixing of diluent with infeed slurry prior to entering the feedwell.

It is a further aim of embodiments to provide a feed dilution apparatus which may be configured to use a shorter mix channel than once conventionally required, whilst maintaining the same dilution flow as longer mix channels found in the prior art.

It is a further aim of embodiments to provide a feed dilution apparatus which is designed to discourage, mitigate, or completely avoid sanding occurrences within a feedwell, feedwell inlet, and/or mixing chamber/conduit—despite low flow velocities (e.g., in the 1-1.5 m/s range), without limitation.

Other preferred objects of the present invention will become apparent from the following description. These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF INVENTION

A feedwell assembly (1) is disclosed. The feedwell assembly (1) may comprise a feedwell (3) and a feed dilution apparatus (27) for diluting infeed slurry with diluent prior to entering the feedwell (3). The feed dilution apparatus (27) may comprise a mixing chamber (5) operably connected to a feedwell inlet (4). The mixing chamber (5) may be configured to receive slurry from a slurry infeed conduit (7) and combine the slurry with the diluent received from a diluent inlet (10). The mixing chamber (5) may be enclosed or configured as a conduit or channel (e.g., U-shaped) having an open top, without limitation.

The feed dilution apparatus (27) may comprise a pump (36) having a centrifugal impeller (16) arranged within a pump housing (9). The centrifugal impeller (16) may be arranged substantially horizontally such that it's axis of rotation is substantially vertical so as to be in substantially parallel alignment with a central axis (not illustrated) of the feedwell (3). The pump housing (9) may arranged below a weir box (12) as depicted. The weir box (12) may have a spill lip (12b). The spill lip (12b) may be arranged at an upper periphery of the weir box (12) (e.g., so as to form an upper weir boundary surface). The spill lip (12b) may be configured to be arranged below an air-liquid interface (20) during operation, e.g., such that there is a depth of submergence (26) between the spill lip (12b) and the air-liquid interface (20). During operation the weir box (12) may have its own air-liquid interface (not illustrated) which is lower in elevation than air-liquid interface (20).

An adjustable connection (11) may be provided between the weir box (12) and the pump housing (9). The adjustable connection (11) may comprise, for example, a telescoping connection as illustrated. The telescoping connection (11) may be positioned between or be comprised of a lower nesting tube portion (12a) of the weir box (12) and an upper nesting tube portion (9a) of the pump housing (9). The upper nesting tube portion (9a) of the pump housing (9) may extend from and be positioned above an upper surface (9b) of the pump housing (9), without limitation.

The feed dilution apparatus (27) may further comprise at least one actuator (18) or actuation device. The at least one actuator (18) may be configured to move the lower nesting tube portion (12a) relative to the upper nesting tube portion (9a) in any conceivable mechanical fashion known in the arts. The at least one actuator (18) may be configured to move at least one support structure (14) which is connected to a portion the weir box (12). For example, the at least one actuator (18) may move at least one support structure (14) and weir box (12) up and down relative to one or more other portions of the feedwell assembly (1), such as feedwell (3) and/or a bridge (8) structure, without limitation. The spill lip (12b) (and/or weir box 12) may be configured to move with respect to the pump housing (9) to change the depth of submergence (26), without limitation.

The pump housing (9) may comprise a pump outlet (9e). The pump outlet (9e) may extend (e.g., substantially horizontally) from a volute sidewall (9c) of the pump housing (9). A portion of the pump outlet (9e) may define a radially-outermost fluid boundary surface portion of the pump housing (9). The pump outlet (9e) may be operatively connected to the mixing chamber (5), for example, via the diluent inlet (10), as depicted.

The feed dilution apparatus (27) may be further characterised in that the pump outlet (9e) may be positioned lower in elevation than the mixing chamber (5), the feedwell inlet (4), and/or the slurry infeed conduit (7), without limitation.

The pump outlet (9e) may be operably connected to an entrance portion (10a) of the diluent inlet (10). The mixing chamber (5) may be operably connected to an exit portion (10c) of the diluent inlet (10). A main channel (10b) of the diluent inlet (10) may extend between the entrance portion (10a) and the exit portion (10c), for example, at an angle with respect to the air-liquid interface (20) as shown. A lower surface of the entrance portion (10a) may be positioned below (or lower than) a lower surface of the exit portion (10c), without limitation. It is further envisaged that while not shown, the main channel (10b) may be arranged to extend in a generally horizontal direction or at a very shallow angle with respect to the air-liquid interface (20).

A feed inlet (6) to the mixing chamber (5) may extend vertically between the mixing chamber (5) and the slurry infeed conduit (7). The diluent inlet (10) may be positioned below the slurry infeed conduit (7). It is further envisaged that while not shown, the feed inlet (6) to the mixing chamber (5) may extend horizontally from the mixing chamber (5); or at an angle with respect to the air-liquid interface (20) between the mixing chamber (5) and slurry infeed conduit (7).

A driveshaft (15) may connect a drive (17) (e.g., comprising a direct-drive motor or motor with optional transmission/reducer) to the centrifugal impeller (16). The driveshaft (15) may extend through open central portions of the weir box (12) and pump housing (9) as shown. The pump housing (9) may have a closed bottom surface (9d) to prevent disruption of quiescent zones below pump housing (9). The closed bottom surface (9d) may be provided below the centrifugal impeller (16).

The feedwell assembly (1) may further comprise a valve (19). The valve (19) may form a portion of feed dilution assembly (27). The valve (19) may be positioned between the pump housing (9) and the mixing chamber (5) to restrict a flow of liquids between the pump housing (9) and the mixing chamber (5). For example, the valve (19) may be provided to a portion of the pump outlet (9e) or to a portion (10a, 10b, 10c) of the diluent inlet (10), without limitation. While not depicted, a plurality of valves (19) may be used in succession, without limitation. The valve (19) may be of any type including, but not limited to a gate valve, ball valve, check valve, butterfly valve, choke valve, knife valve, diaphragm valve, globe valve, plug valve, solenoid valve, or spool valve, without limitation.

According to some embodiments, the weir box (12) may include one or more baffles (30). The one or more baffles (30) may extend radially along a sidewall (12c) of the weir box (12). The one or more baffles (30) may extend at an angle (34) with respect to a radial (35) from a central portion of the weir box (12).

In some embodiments, vanes (16b) of the centrifugal impeller (16) may comprise a flared outer profile (16h) to help urge or bias flow radially outwardly.

A method of diluting slurry entering a feedwell (3) of a thickener/clarifier is further disclosed. The slurry may enter a feedwell assembly (1) from a slurry infeed conduit (7).

The method may comprise the step of providing a feedwell assembly (1) having a feed dilution apparatus (27) as described above. The method may comprise the step of rotating a centrifugal impeller (16). The method may comprise drawing clarified liquor and/or froth (from adjacent an air-liquid interface (20)) over a spill lip (12b), and into a weir box (12) by virtue of a depth of submergence (26). The method may comprise the step of shearing the clarified liquor and/or froth within the weir box (12) and/or within a pump housing (9).

The method may comprise the step of passing the sheared clarified liquor and/or froth to a mixing chamber (5). The method may comprise the step of combining the sheared clarified liquor and/or froth with the slurry in the mixing chamber (5). The method may comprise the step of feeding the feedwell (3) with a mixture of the slurry (i.e., from infeed conduit 7) and the sheared clarified liquor and/or froth (i.e., from pump housing 9).

Further details, features, and advantages of the present invention will become apparent from the following detailed description.

BRIEF DESCRIPTION OF THE DRAWINGS

By way of example only, preferred embodiments of the invention will be described more fully hereinafter with reference to the accompanying figures.

To complement the description which is being made, and for the purpose of aiding to better understand the features of the invention, a set of drawings illustrating various systems and methods according to certain embodiments has been added to the present specification as an integral part thereof, in which the following has been depicted with an illustrative and non-limiting character. It should be understood that like reference numbers used in the drawings (if any are used) may identify like components. In the drawings:

FIGS. 11-16 suggests an alternative embodiment of a weir box 12 showing baffles 30 provided within a weir box 12. As shown, in some embodiments, a pump 36 may include an impeller 16 comprising an upper impeller 16c and a lower impeller 16d connectable to a driveshaft 15 via a hub 16a.

FIG. 11 shows an isometric view of a non-limiting alternative embodiment of a feed dilution apparatus 27 in accordance with the invention.

FIG. 12 is a cutaway view of the feed dilution apparatus 27 shown in FIG. 11.

FIG. 13 depicts baffle 30 components of the feed dilution apparatus 27 shown in FIGS. 11 & 12.

FIG. 14 shows a weir box 12 component of the feed dilution apparatus 27 shown in FIGS. 11 & 12.

FIG. 15 shows an upper impeller 16c component of the rotor 16 shown in the feed dilution apparatus 27 shown in FIGS. 11 & 12.

FIG. 16 shows a lower impeller 16d component of the rotor 16 shown in the feed dilution apparatus 27 shown in FIGS. 11 & 12. The two impeller portions 16c, 16d may be independently affixed to driveshaft 15 via their respective hubs as shown; however, the lower impeller 16d may be connected to or affixed directly to the upper impeller 16c (e.g., via fastening or welding hub(s) 16a together), without limitation.

DETAILED DESCRIPTION

Figure 1:
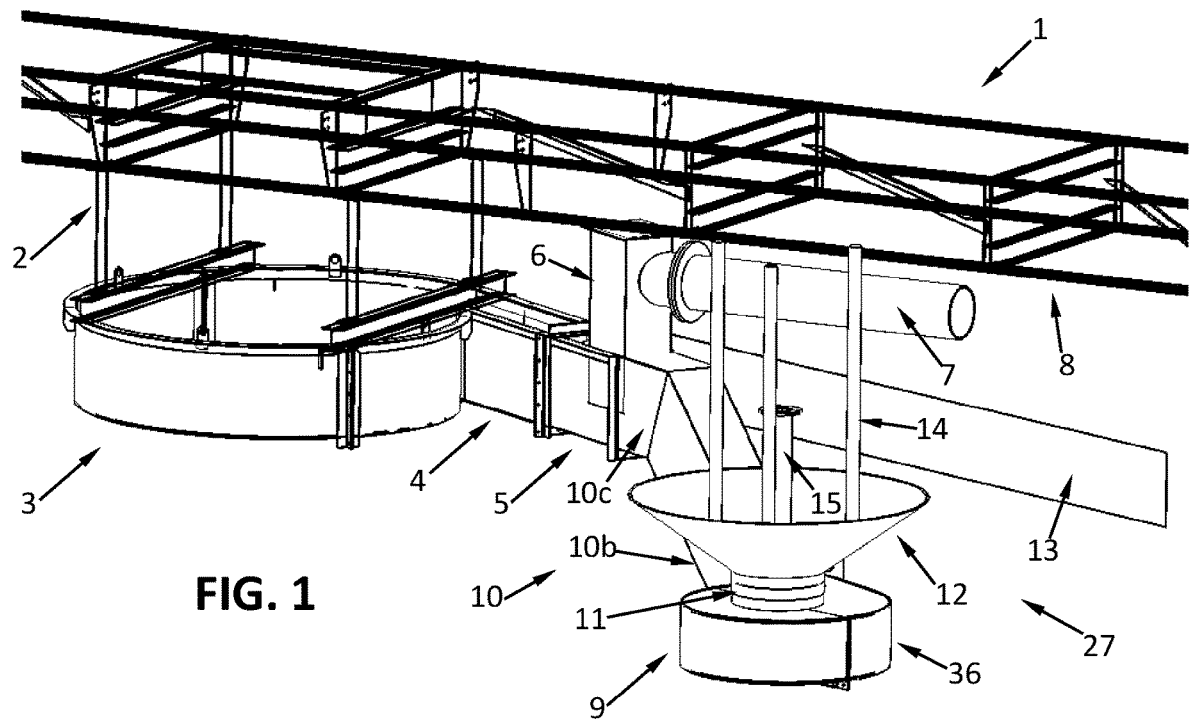
FIGS. 1 and 2 are alternative isometric views illustrating a feedwell assembly 1 comprising a novel feed dilution apparatus 27 according to non-limiting embodiments of the invention.
Figure 2:
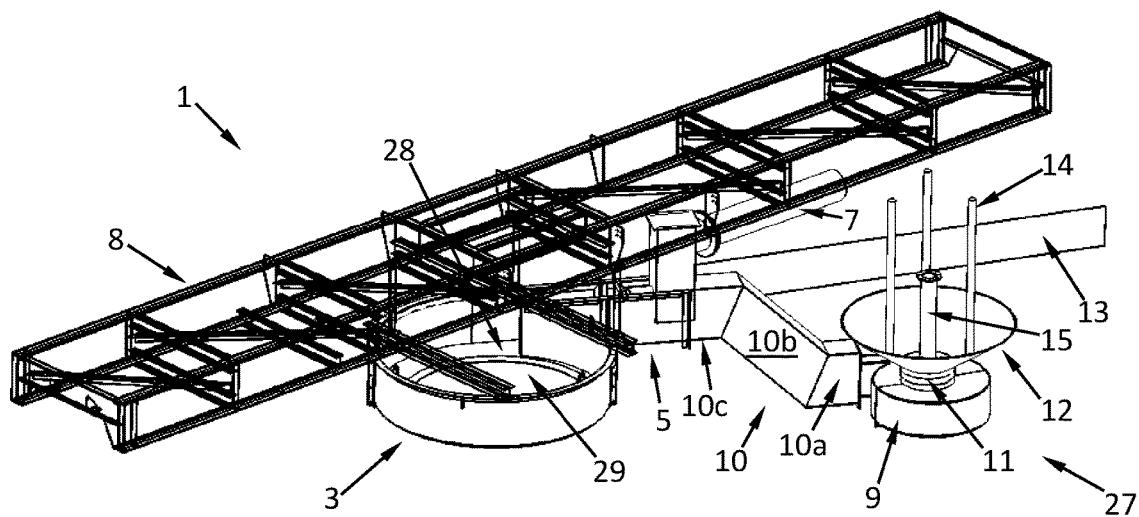
Figure 3:
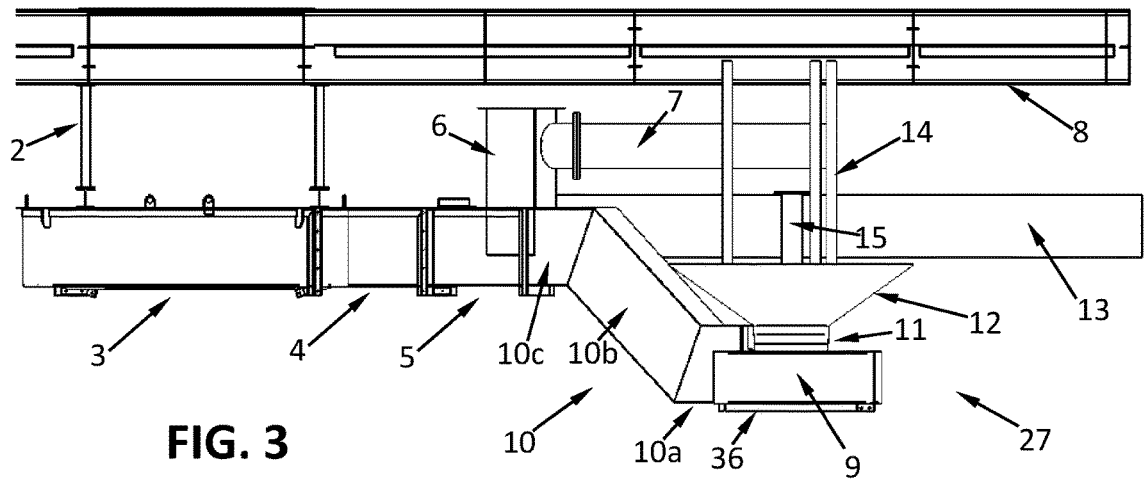
FIG. 3 is a side elevation view of the feedwell assembly 1 shown in FIGS. 1 and 2.
Figure 4:
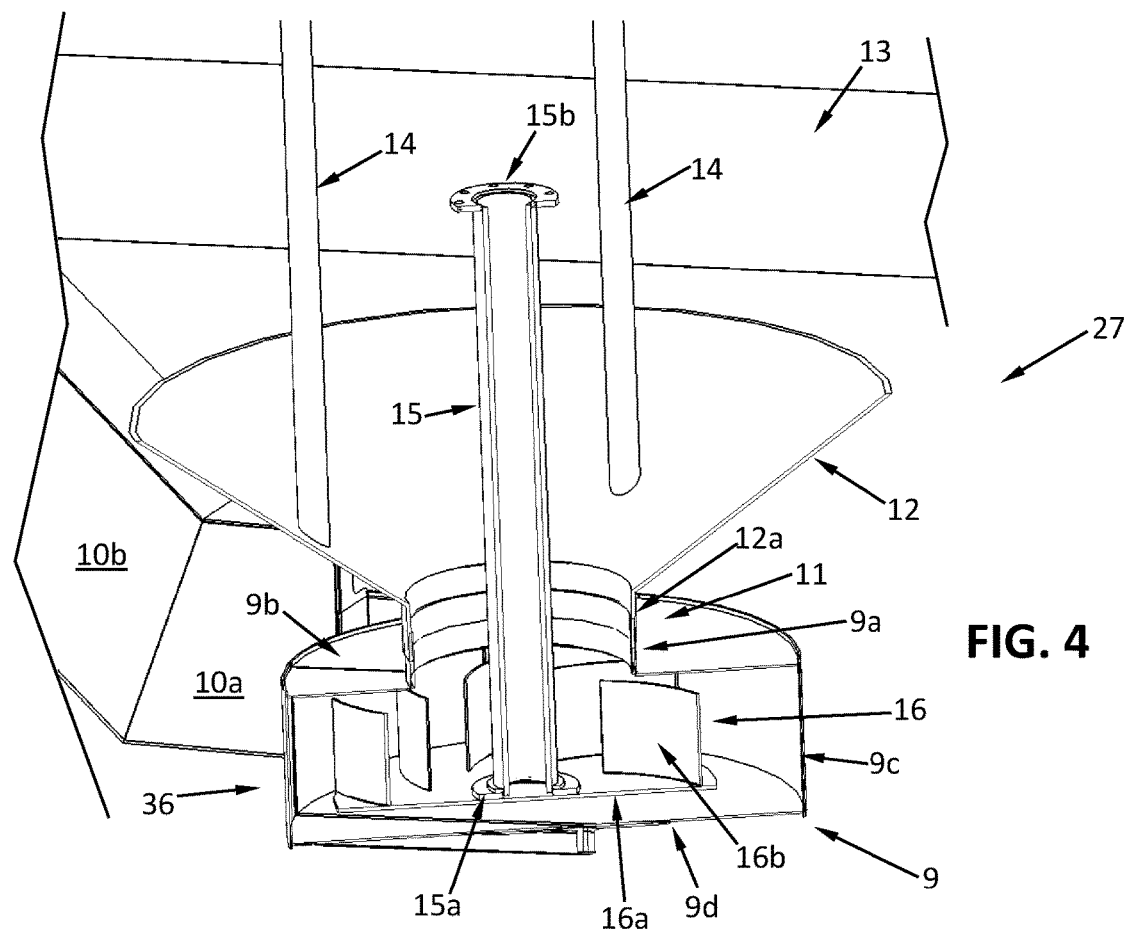
FIG. 4 is a cutaway side view of a portion of the feedwell assembly 1 showing, in particular, a feed dilution apparatus 27 comprising a centrifugal impeller 16 and submersible weir box 12.
Figure 5:
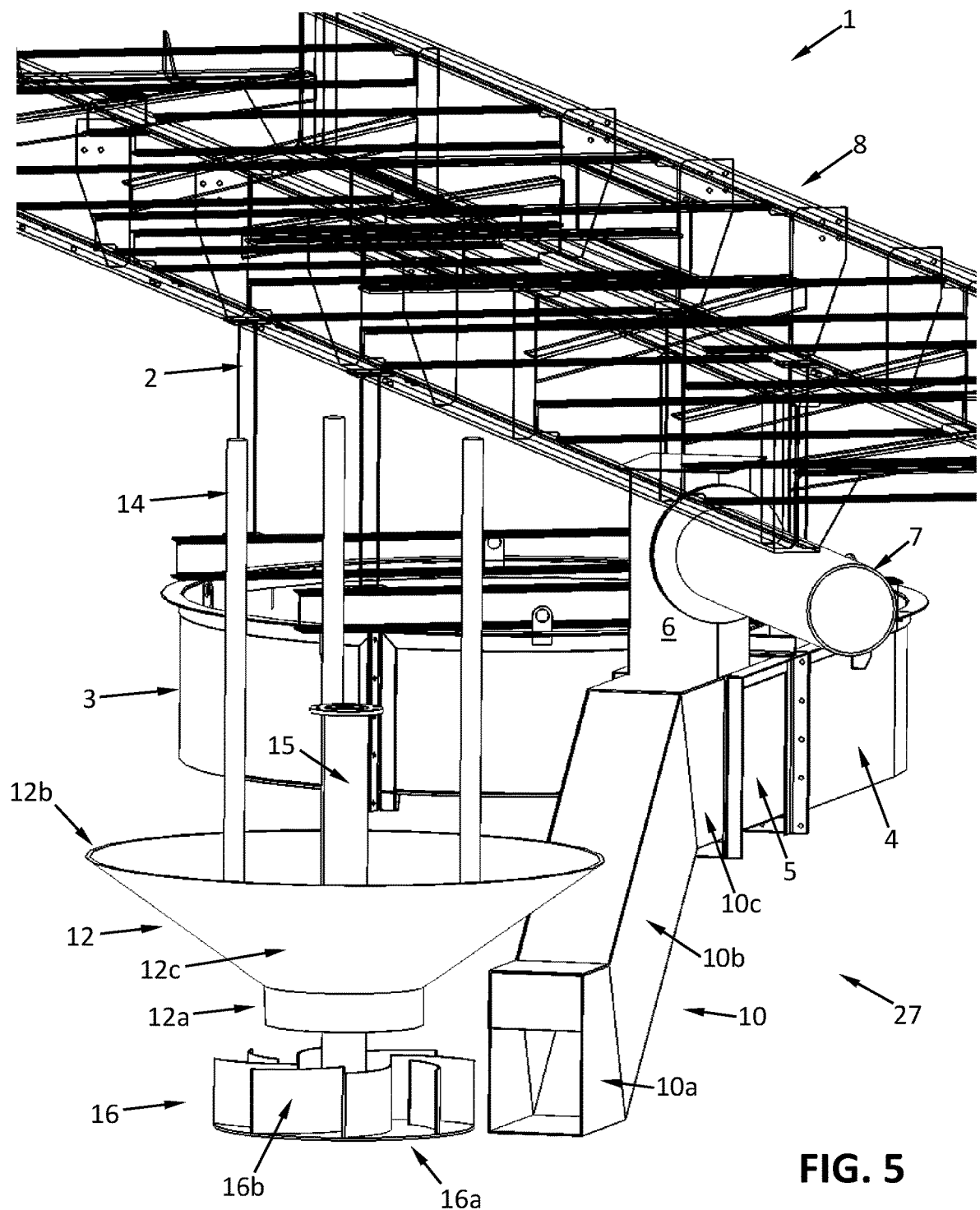
FIG. 5 is an isometric view of the feedwell assembly 1 of FIGS. 1-3, with the pump housing 9 and skimmer baffle 13 removed (not shown) for clarity.
Figure 6:
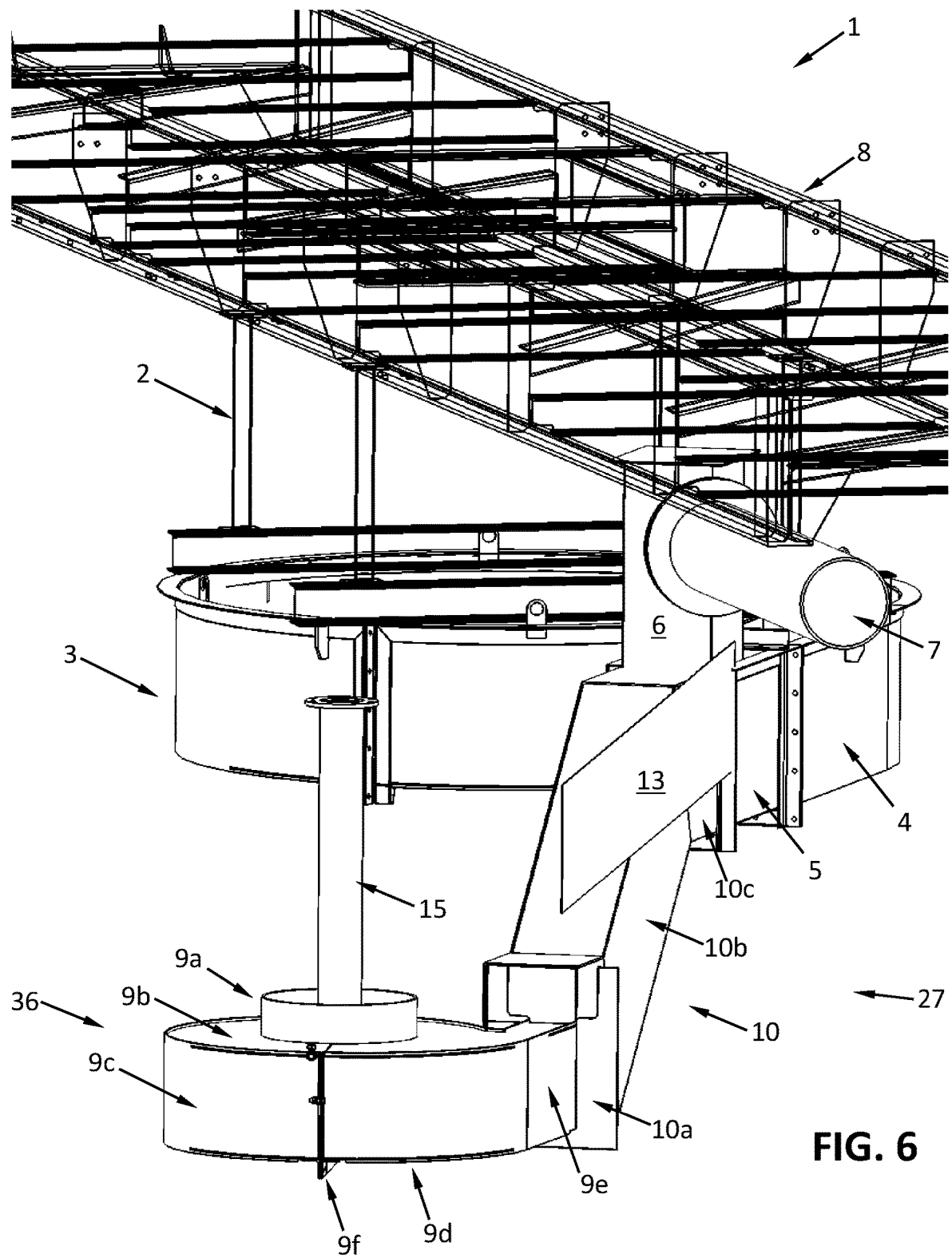
FIG. 6 is an isometric view of the feedwell assembly 1 of FIGS. 1-3, with the weir box 12 removed (not shown) for clarity.
Figure 7:
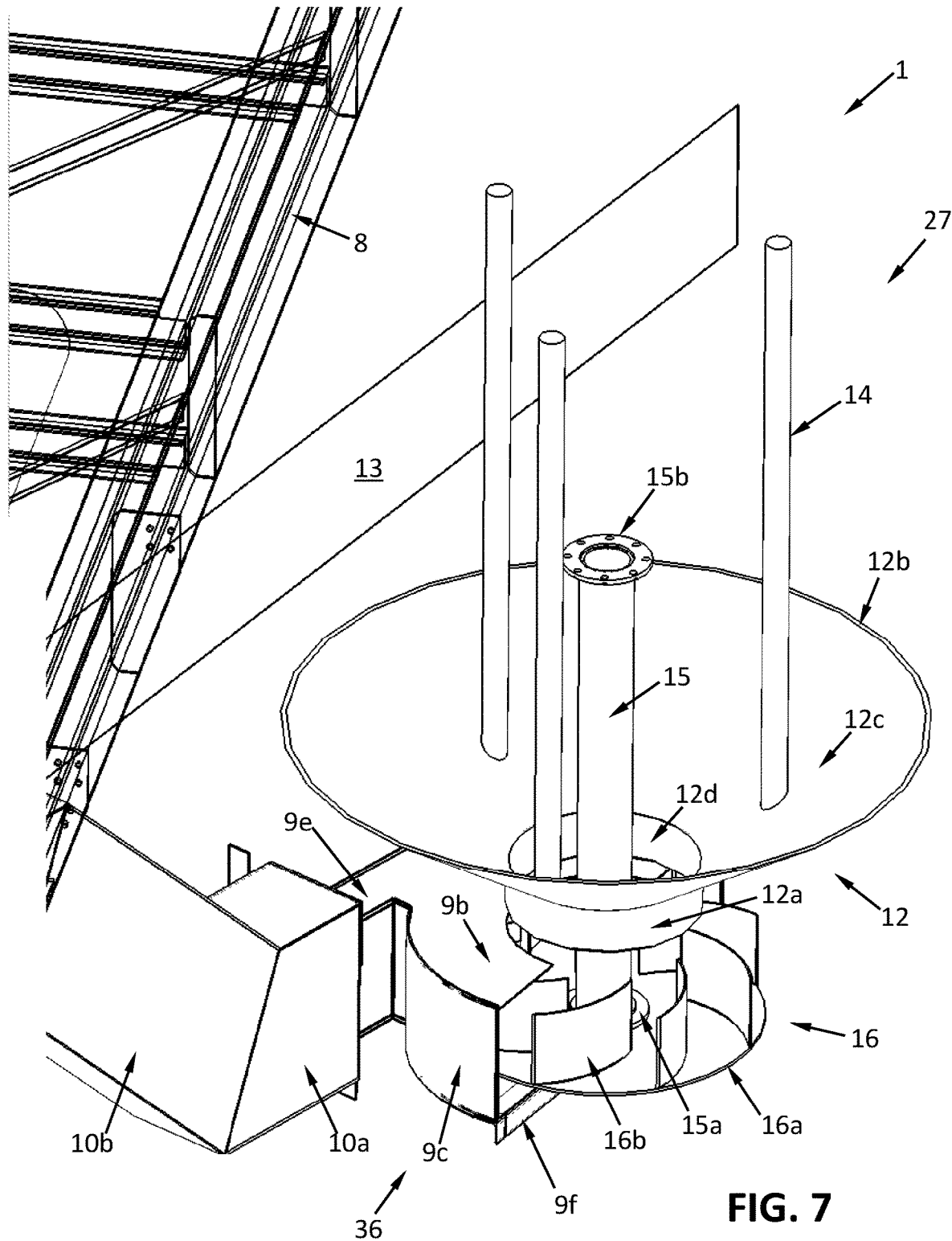
FIG. 7 is an isometric view of the feedwell assembly 1 of FIGS. 1-3, with a portion of the pump housing 9 removed (i.e., not shown) for clarity.

As will be appreciated by this description and accompanying figures, a novel feed dilution apparatus design is proposed. The feed dilution apparatus incorporates a centrifugal-type pump device 36 that utilizes a closed housing bottom and an upper open end for drawing diluent into the housing of the pump from surface portions of contents within a thickener/clarifier. This unique design is configured to encourage clarified liquor (along with froth/foam which may be present thereon) to spill over a boundary of the upper opening and enter an upper portion of the pump housing 9. After entering the pump housing, the centrifugal-type pump device 36 may break up air and entrained solids within the froth/foam by virtue of shear and rotating impeller 16, and combine the resultant mixture of solids and diluent with infeed slurry upstream of a feedwell inlet by virtue of pumping.

A housed agitator (e.g., a rotating centrifugal impeller comprising vanes) may be placed below an upper fluid surface boundary of the liquid/slurry contents within a thickener/clarifier tank. The agitator may be preferably configured as a pumping device capable of pulling fluids downward from surface portions of the liquid contents within the thickener/clarifier and moving the same to a mixing chamber. Shear rate of fluids approaching the housed agitator may serve to assist with the breaking down of froth which may be present therein.

A slurry feed pipe or launder arranged adjacent to the housed agitator may be arranged to extend across a portion of a tank wall of a thickener/clarifier. The same may be configured to be suspended under and/or supported by a bridge structure and may be inclined to run with a 1% slope to a kill box just outside the feedwell. From the kill box, the slurry may change direction and enter a mixing chamber (e.g., a 'mix channel,' 'mixing conduit,' or 'launder') leading into the feedwell, with dilution water from the centrifugal-type pump device flowing underneath the heavier slurry feed stream. By orienting the incoming diluent below the denser incoming infeed slurry, improved mixing may be exhibited.

The unique embodiments described herein offer the unique ability to discharge dilution water substantially horizontally with respect to an agitator, thus avoiding the potential problems associated with existing feed dilution systems which generally require pumping vertically upward (via an axial impeller). Accordingly, the more complex task of converting head to a stable horizontal flow of diluent can be avoided with the proffered embodiments.

Turning now to the accompanying figures, according to some embodiments, a feedwell assembly 1 comprises a feedwell 3 which may be supported by a bridge structure 8.

The feedwell 3 may, for example, be supported by a number of support structures 2—each extending between a portion of the bridge structure 8 and a respective portion of the feedwell 3, without limitation. The feedwell 3 may comprise an open bottom 29, and may have a lower shelf 28 and a sidewall leading to a feedwell inlet 4 as shown. A plethora of feedwell 3 configurations, shapes, sizes, and designs is anticipated for use with embodiments described herein. Upstream of the feedwell inlet 4 may be provided a mixing chamber 5 configured to receive infeed slurry and diluent. For example, stemming from the mixing chamber 5 may be a feed inlet 6 and a diluent inlet 10. The feed inlet 6 may extend from, be operably connected to, and/or fluidly communicate with a slurry infeed conduit 7. The feed inlet 6 may, as shown, be configured to slow or change the direction of slurry, or otherwise be configured as a 'kill box', without limitation. For example, the feed inlet 6 may extend perpendicularly between mixing chamber 5 and slurry infeed conduit 7, or at an angle with respect to horizontal, without limitation.

The slurry infeed conduit 7 may be configured to deliver infeed slurry to the feedwell assembly 1 from upstream process equipment. Slurry entering mixing chamber 5 may be diluted with diluent flowing into the mixing chamber 5 via diluent inlet 10. The diluent may be supplied to the mixing chamber 5 by a feed dilution apparatus 27 comprising a centrifugal pump apparatus. As previously mentioned, mixing may be improved by orienting the diluent inlet 10 below the feed inlet 6.

As will be appreciated by the accompanying figures, the feed dilution apparatus 27 comprises a weir box 12 which may be supported by a pump housing 9 or bridge structure 8, via support structures 14. Other methods of supporting weir box 12 are envisaged.

The support structures 14 may be operably connected to internal or external portions of the weir box 12, without limitation—including, but not limited to, an upper or inner surface of a sidewall 12c of the weir box 12, a lower or outer surface of a sidewall 12c of the weir box 12, or an upper spill lip 12b portion of the weir box 12. As shown in FIGS. 1-7 and 10, the support structures 14 may extend upwardly so as to be operably connected to a portion of bridge structure 8 spanning over a portion of the thickener/clarifier tank (not shown). However, while not shown, support structures 14 may alternatively be placed between a portion of the weir box 12 and a portion of at least one of: the pump housing 9, the diluent inlet 10, or another component of the feedwell assembly 1 (e.g., a skimmer baffle 13), without limitation.

The pump housing 9 may comprise a top surface 9b, a volute sidewall 9c, and a preferably closed bottom surface 9d which collectively house a centrifugal impeller 16 therein. The bottom surface 9d may be substantially or entirely closed off to avoid further disruption of quiescent zones below. Extending from the top surface 9b, may be provided an upper nesting tube portion 9a, which is configured to receive or be received within a lower nesting tube portion 12a of weir box 12. An opening may be present within central portions of the lower 12a and upper 9a nesting tube portions. Though the pump housing 9 may be provided as a single monolithic unitary piece, it is preferably constructed as a multipart component. For example, the pump housing 9 may be provided with a clamshell or two-piece design. The pump housing 9 may employ one or more connecting flanges 9f provided on each part of the clamshell or two-piece design. The connecting flanges 9f may be secured together using fasteners (e.g., rivets or bolts and nuts). Parts of the pump housing 9 may be fully or partially disassembled to assist with sideways (i.e., horizontal) removal and/or insertion of centrifugal impeller 16. Portions of the pump housing may be hinged together, without limitation. It is envisaged that in other alternative embodiments (not shown), the pump housing 9 may be configured such that bottom surface 9d is removable from other portions of the pump housing 9, so as to allow the centrifugal impeller 16 to be removed downwardly from the pump housing 9. More alternatively, upper surface 9b may be made to be removable from the pump housing 9 to allow driveshaft 15 and centrifugal impeller 16 to be extracted upwardly, and inserted downwardly into the pump housing 9 from above.

A pump outlet 9e may extend from the volute sidewall 9c of the pump housing 9. The pump outlet 9e may be operably connected to and/or fluidly communicate with an entrance portion 10a of diluent inlet 10 as depicted. The pump outlet 9e may be located adjacent a radially-outermost sidewall 9c portion of pump housing 9, without limitation. As suggested in FIG. 10, a valve 19 may be provided at or to a portion of the pump outlet 9e, for example, between the pump outlet 9e and diluent inlet 10, and/or to any portion of diluent inlet 10 to adjust or restrict the flow of diluent to mixing chamber 5 downstream of the centrifugal-type pump apparatus. By adjusting the valve 19, an optimal amount of mixing can occur between the diluent and the infeed slurry arriving from conduit 7 via slurry inlet 6. Moreover, by changing a flow orifice geometry of the valve 19 over time, pump performance can be improved and dry run of centrifugal impeller 16 can be avoided.

The pump housing 9 may be arranged substantially horizontally (as depicted) such that centrifugal impeller 16 rotates in a plane which is approximately parallel to an air-liquid interface 20 within a thickener/clarifier, without limitation. However, it is anticipated that other orientations from horizontal are possible. The weir box 12 may be arranged above the pump housing 9 as shown, such that its spill lip 12b is arranged slightly below the air-liquid interface 20. In operation, a depth of submergence distance 26 exists between spill lip 12b and air-liquid interface 20 so that the centrifugal-type pump apparatus can be fed with a continuous supply of diluent and/or froth/foam.

The weir box 12 may be operably connected to the pump housing 9 using a rigid connection (not shown), but it may also be, as shown, operably connected to the pump housing 9 via an adjustable connection 11 between weir box 12 and pump housing 9. The adjustable connection 11 may be a sliding telescoping connection between the upper nesting tube portion 9a of the pump housing 9 and the lower nesting tube portion 12a of the weir box 12, without limitation. A seal, such as an O-ring or piston ring (not shown) may be placed between the upper 9a and lower 12a nesting tube portions, or around the connection 11, without limitation. Alternatively, a flexible boot or tubing (e.g., of the bellows or accordion type) may connect the weir box 12 to the pump housing 9 and serve as a telescoping connection, without the need for nesting telescoping components 9a, 12a.

To deliver diluent to the mixing chamber 5, weir box 12 is supported such that it remains set at a position such that its spill lip 12b is below the air-liquid interface 20 (refer to depth of submergence 26). Froth/foam containing entrained solids and clarified liquor is enabled to spill over spill lip 12b and enter the weir box 12, which, in turn, feeds the centrifugal-type pump apparatus 36 below. The centrifugal impeller 16 within the pump housing 9 turns, thus drawing the froth/foam containing entrained solids and clarified liquor into the pump housing 9 and then out of the pump outlet 9e. The flow of the froth containing entrained solids and clarified liquor may be moderated by optional valve 19 before being expelled into mixing chamber 5.

Fluids and entrained solids exiting the pump outlet 9e may enter an entrance portion 10a of the diluent inlet 10, and then pass through a main channel 10b and an exit portion 10c of the diluent inlet 10 before entering the mixing chamber 5. As shown, embodiments may have a centrifugal-type pump 36 submerged so as to be arranged below the mixing chamber 5 (i.e., in side elevation). Accordingly, the entrance portion 10a and exit portion 10c of the diluent inlet 10 may each be arranged at different respective levels with respect to one another, with a change in vertical distance or differential pressure head between the two. Any difference in elevation may be made up for by the pumping characteristics of impeller 16 and/or drive 17 inputs.

An optional skimmer baffle 13 may be arranged so as to extend across a portion of the air-liquid interface 20 of the thickener/clarifier to encourage clarified liquor and froth containing entrained solids to flow into the weir box 12. The skimmer baffle 13 may be attached to one or more portions of the bridge structure 8, weir box 12, or other component of the feedwell assembly 1 in any manner which promotes or biases froth and/or clarified phase over spill lip 12b and into the weir box 12.

Though not shown, configurations of a feed dilution apparatus 27 may be such that the overall height of weir box 12 is minimal and such that sidewall 12c angles with respect to horizontal are configured to be relatively shallow. In such embodiments, it is possible that entrance portion 10a and exit portion 10b may be provided at the same or a very similar elevation (or depth with respect to air-liquid interface 20), without limitation.

Figure 8:
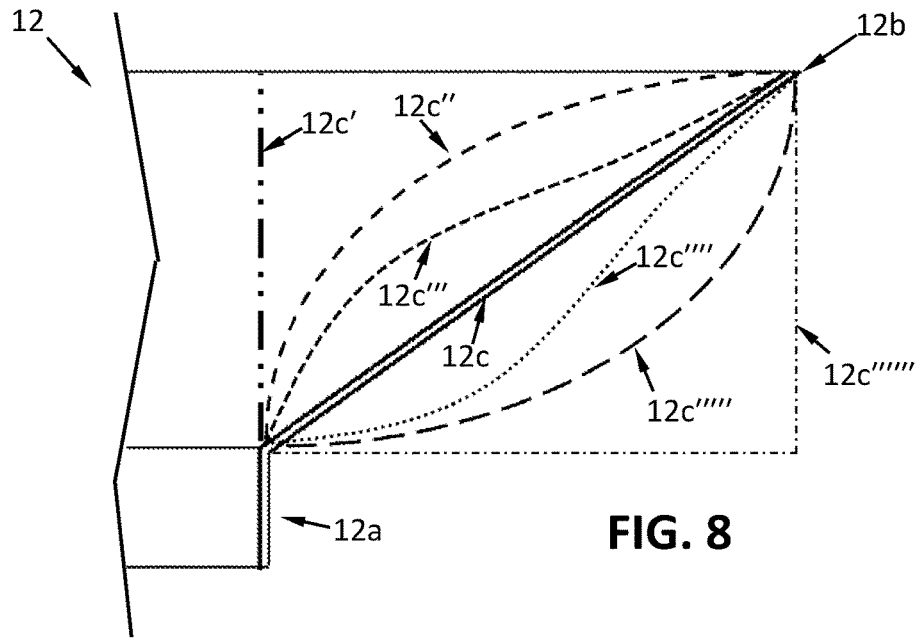
FIG. 8 suggests six non-limiting alternative profiles for sidewall 12c of a weir box 12 in accordance with embodiments of the invention.

Turning now to FIG. 8, several alternative profile shapes of a weir box 12 sidewall 12c are depicted. The figure shows a portion of the weir box 12 shown in FIGS. 1-7 in side cross-section. 12c' represents a sidewall alternative shape/profile wherein the sidewall 12c may extend substantially vertically upwards to a spill lip 12b (i.e., no slope angle). 12c'''' represents a weir box 12 sidewall 12c alternative profile wherein a lower annular shelf may be provided to extend radially outwardly from 12a, and a substantially vertical sidewall portion may extend upwardly from an outer edge of the lower annular shelf. Sidewall 12c'' suggests a smooth convex (e.g., toroidal or doughnut-shaped) surface may be provided between spill lip 12b and lower nesting tube portion 12a, without limitation. Such embodiments may help reduce turbulence and improve flow over spill lip 12b towards the entrance to pump housing 9. Sidewall alternatives 12c''' and 12c'''' suggest that various compound curve or complex serpentine profiles may be used for a sidewall 12c of weir box 12, without limitation. Other imaginative geometries for a weir box sidewall 12c are anticipated, and FIG. 8 is being provided merely as an example to exhibit that the inventors have contemplated a variety of cross-sectional shapes for weir box 12. It is envisaged that computational fluid dynamics (CFD) principles or empirical experimental information may be used to optimize geometries of feed dilution apparatus 27 components for improved flow regimes and overall performance of the feedwell apparatus 1.

It should further be understood and appreciated that while the weir box 12 is shown in the figures to be a frustoconically-shaped piece, with a spill lip 12b comprising a round or oval annular shape (i.e., in top plan view), the same may take on many other top plan view profile shapes including, but not limited to, trapezoidal spill lips 12b, rectangular spill lips 12b, square spill lips 12b, chevron-shaped spill lips 12b, triangular spill lips 12b, etc., without limitation. Accordingly, the top plan view peripheral geometry of weir box 12 may take on any regular or irregular annular shape (e.g., polygonal) without departing from the spirit and scope of the inventive concepts described herein.

Figure 9:
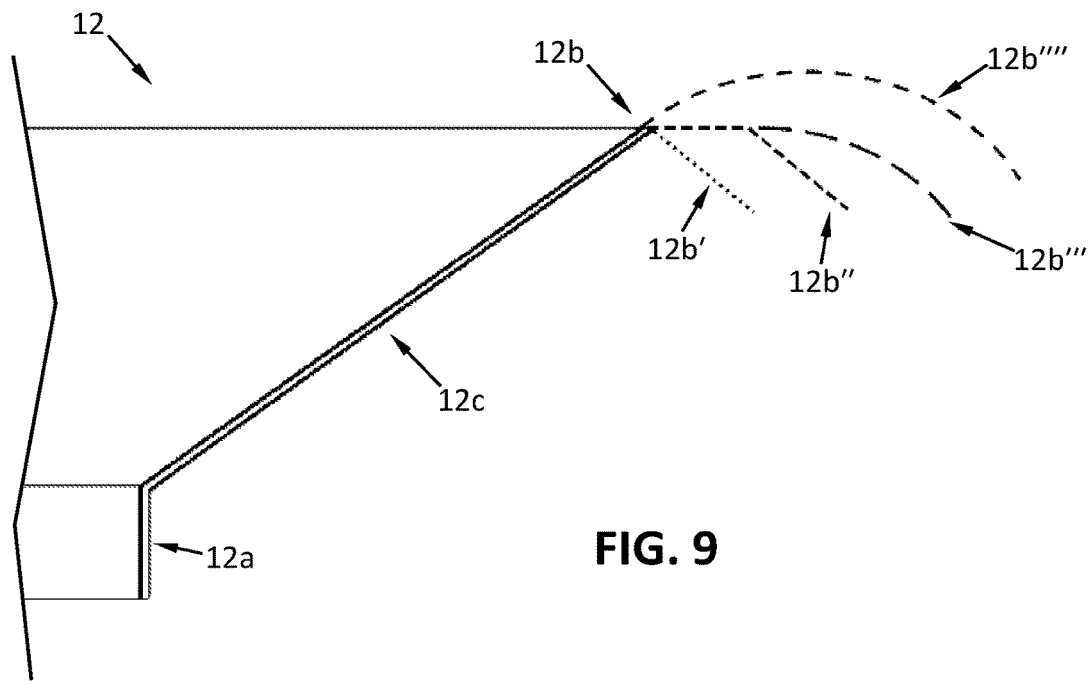
FIG. 9 suggests four non-limiting alternative profiles for spill lip 12b of weir box 12 in accordance with embodiments of the invention.

Turning now to FIG. 9, a partial side cross-sectional view of weir box 12 shows various alternative embodiments of a spill lip 12b. The spill lip 12b may simply comprise a sharp upper edge portion of sidewall 12c, or it may comprise a smooth surface profile or geometry comprising a gradual arcuate (e.g., toroidal) surface 12b'''' extending from an edge of sidewall 12c in order to improve flows, optimize fluid mechanics/hydrodynamics, and/or reduce turbulence within the tank of the thickener/clarifier in surrounding portions of the weir box 12. Spill lip 12b' may comprise a sharp depending annular projection as shown, or a spill lip 12b'' may alternatively comprise a flat portion between an upper edge of sidewall 12c and a depending annular projection or flange. In some embodiments, a spill lip 12b''' may comprise a smooth surface profile or geometry comprising a gradual arcuate (e.g., toroidal or doughnut-shaped) surface 12b'''' extending from a flat portion, without limitation.

A number of support structures 14 supporting the weir box 12 may optionally be configured to directly or indirectly adjust the depth of submergence 26 of spill lip 12b. For example, a support structure 14 may form a portion of an actuator 18, such as a linear actuator, without limitation. The actuator 18 may be manually actuated or actuated in an automated fashion via a control system 24, without limitation. The support structure 14 may, in some embodiments, comprise, for instance, a portion of an actuator 18, such as an extendable/retractable piston rod of hydraulic or pneumatic cylinder; an extendable plunger of a solenoid; a worm-drivable screw; a nut drivable threaded rod; a rack which may be driven by a pinion, a strap which may be part of a ratchet mechanism, a cable equipped with an adjustable turnbuckle mechanism, or other means for adjustably supporting weir box 12 from bridge structure 8, pump housing 9, diluent inlet 10, thickener/clarifier tank, or other component forming a portion of feedwell assembly 1, without limitation. Support structures 14 may be positioned between a part of the pump housing 9 and a portion of sidewall 12c of weir box 12, without limitation. One or more actuators 18, and one or more support structures 14 may be used as means for raising and lowering weir box 12 to affect and change depth of submergence 26.

Figure 10:
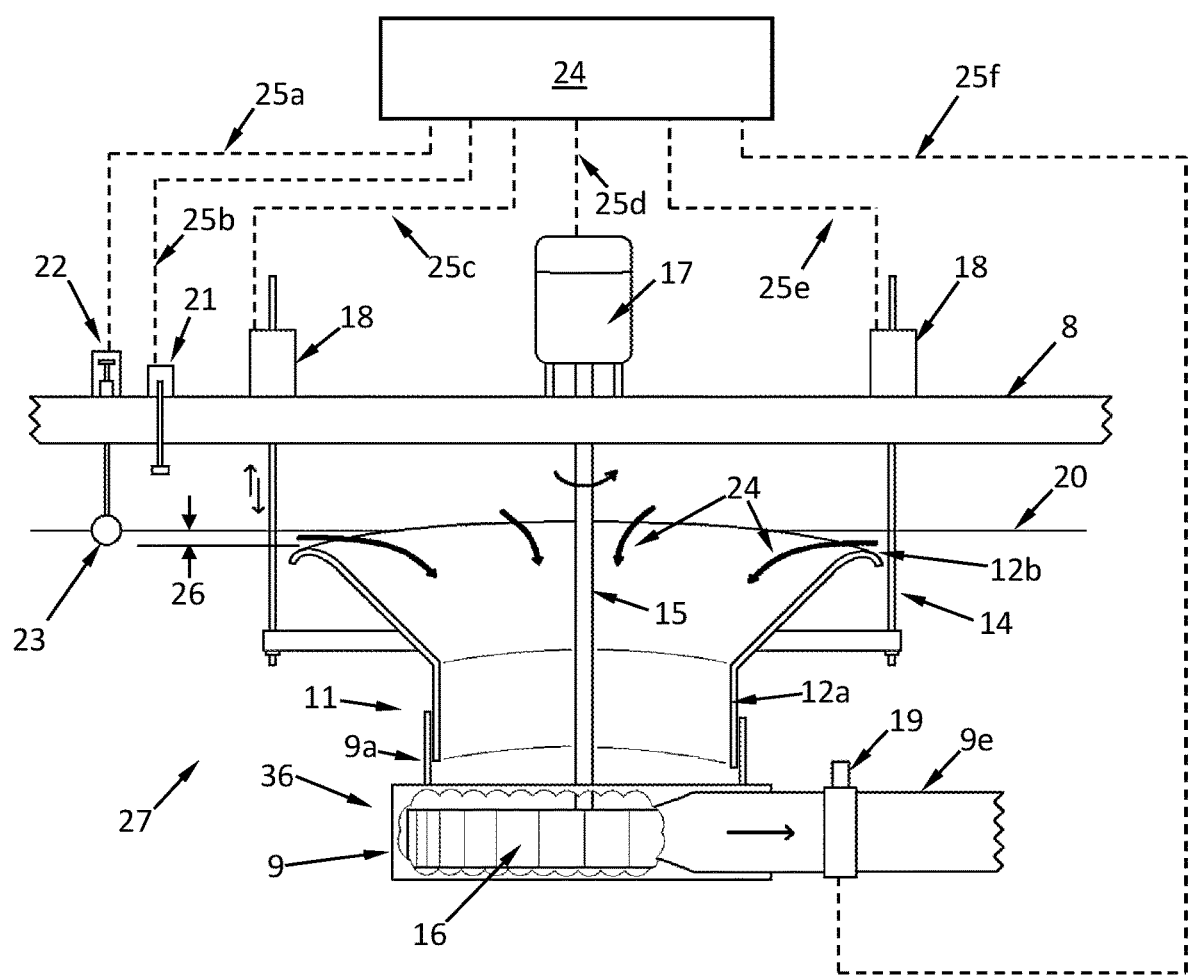
FIG. 10 suggests an alternative embodiment of a feed dilution apparatus 27.
Figure 11:
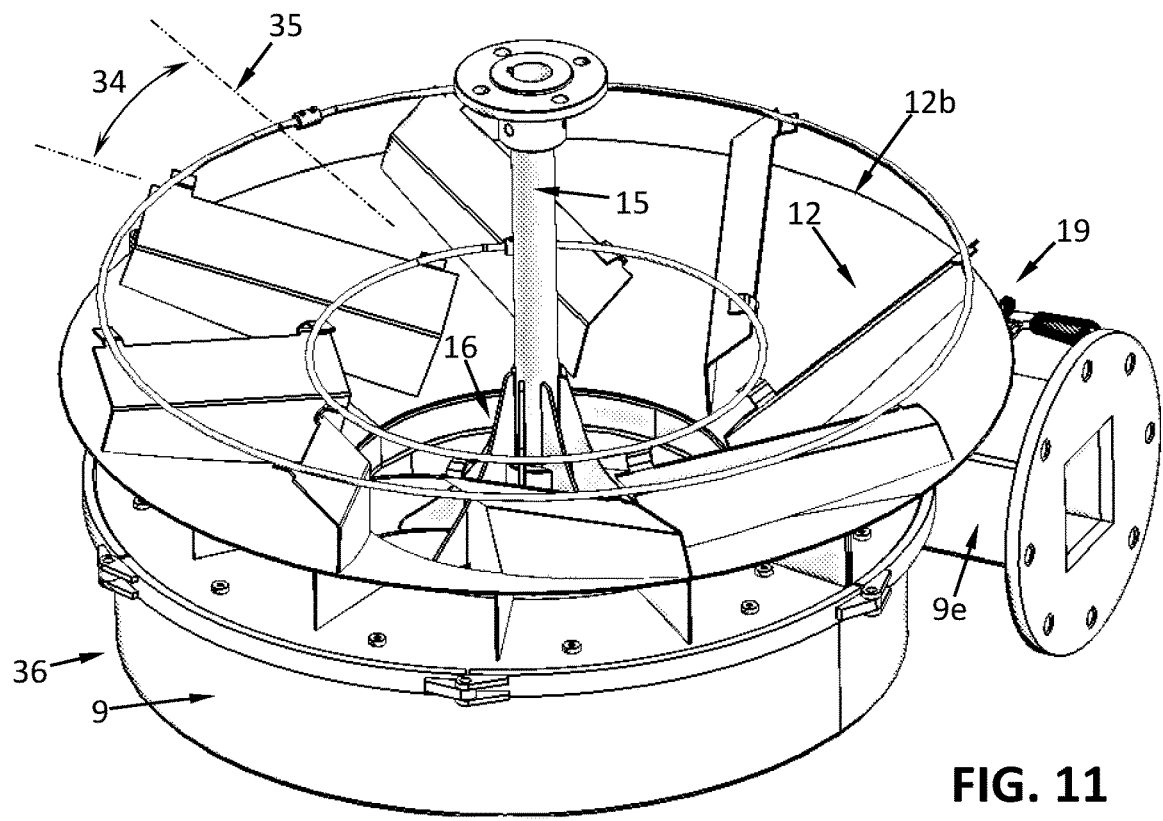
Figure 12:
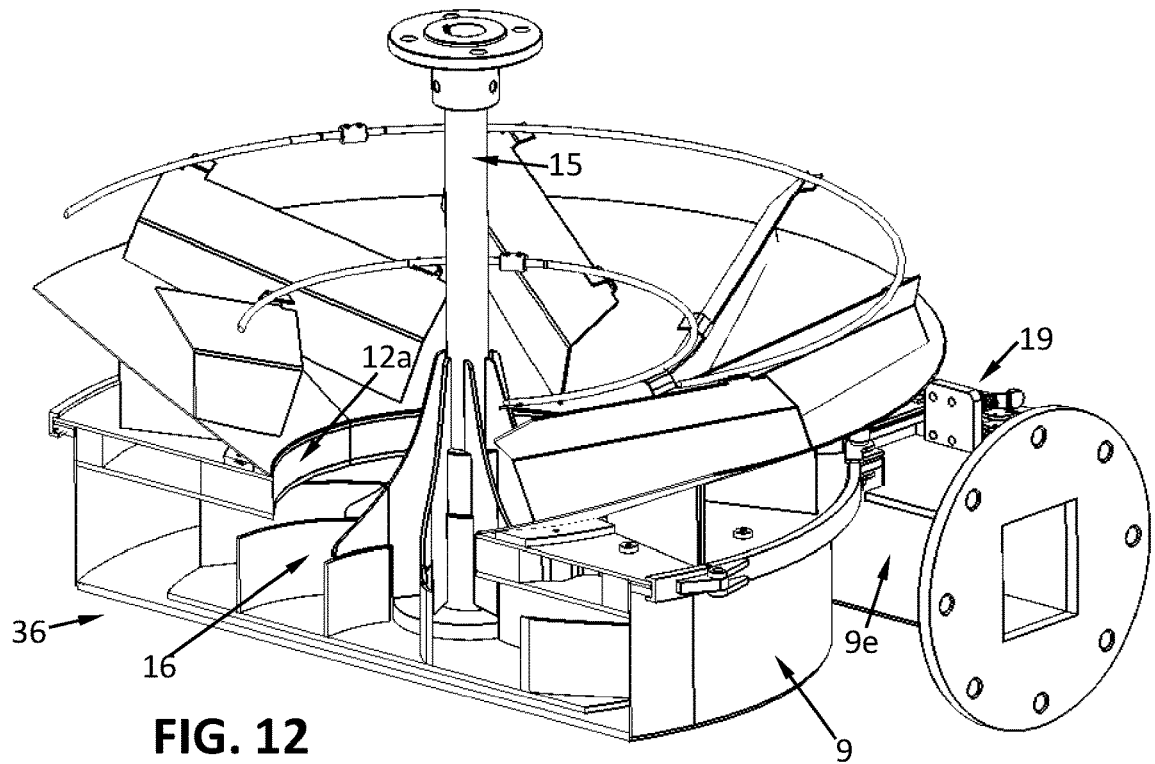

As shown in FIGS. 1-7, support structures 14 may extend from an interior surface potion of weir box 12. As shown in FIG. 10, support structures 14 may extend from an exterior surface potion of weir box 12. While not shown, support structures 14 may extend between a surface potion of weir box 12 and a surface potion of a component of feedwell assembly 1 or of a thickener/clarifier, without limitation. In any of the above configurations, the support structures 14 may be rigid, flexible, or adjustable, e.g., via the use of one or more actuators 18, without limitation.

A driveshaft 15 may be used to drive and rotate the centrifugal impeller 16 within pump housing 9. The driveshaft 15 may have a driven end 15a connected to a portion of the centrifugal impeller 16, such as a hub 16a portion of the centrifugal impeller 16. The hub 16a may comprise a number of straight or curved vanes 16b oriented in any direction which encourages drawing of fluids over spill lip 12b and/or pumping of the fluids to the mixing chamber 5. As shown, in some embodiments, the hub 16a of the centrifugal impeller 16 may simply comprise a bottom wall to which vanes 16b are affixed and a distal driven end 15a of shaft is secured.

A drive end 15b of driveshaft 15 may be fitted to a drive 17. Drive 17 may comprise a motor, such as a variable frequency drive (VFD) motor with optional reducer, without limitation. Driven end 15b of driveshaft 15 may be coupled to drive 17 in any fashion known in the art.

As depicted in FIG. 10, one or more actuators 18 may be used to raise and lower the weir box 12 to change the depth of submergence 26 of spill lip 12b and/or to change the amount of clarified phase/froth entering the weir box 12. Actuators 18 may be as simple as a nut which can be manually rotated to raise and lower support structures 14 which may be configured as vertically-extending threaded rods. However, actuators 18 may comprise more sophisticated linear actuators, cylinders, hydraulic arms, mechanized linkages, rotatable spools for raising and lowering support structures 14 configured as cables, etc. Accordingly, it should be understood that the combination of numerals 14 and 18 may comprise any equivalent means known which could be used to adjust the relative positioning between spill lip 12b and air-liquid interface 20. If the means for adjusting a depth of submergence 26 of spill lip 12 is automated, a control system 24 may deliver periodic control signals 25c, 25e to one or more actuators 18 to raise and/or lower weir box 12, without limitation.

In some embodiments, the feed dilution apparatus 27 of the feedwell assembly 1 may comprise an ultrasonic level sensor 21 to periodically determine a real-time level of the air-liquid interface 20 or a relative positioning of a portion of the weir box 12 (e.g., spill lip 12b) with respect to the air-liquid interface 20. The ultrasonic level sensor 21 may take periodic measurements to determine the depth of submergence 26 and may send control signal(s) 25b to the control system 24 on a periodic basis. The period used may be infrequent or so frequent as to provide continuous online monitoring and control. The control system 24 may comprise a graphical user interface (GUI) (not shown) which may be configured to display the current depth of submergence 26 on a screen. In this regard, an operator of a thickener/clarifier may be informed, alarmed, or otherwise made aware of current operating conditions of the feed dilution apparatus 27—including, but not limited to a real-time depth of submergence 26 or required adjustment need to correct the depth of submergence 26. Other operating conditions which may be displayed include, but are not limited to, RPM of drive 17 and/or centrifugal impeller 16, flow rate of valve 19, and fluid level within weir box 12.

In addition to, or in lieu of the ultrasonic level sensor 21, a mechanical level sensor 22 may be employed to measure a depth of submergence 26 of spill lip 12b in relation to air-liquid interface 20. The mechanical level sensor 22 may incorporate a float 23, such as a ball filled with gas or a low-density solid material such as closed cell foam. The float 23 may find a location of neutral buoyancy adjacent the air-liquid interface 20, and the mechanical level sensor 22 may deliver one or more control signals 25a to the control system 24 as previously described for the ultrasonic level sensor 21. Level sensors 21, 22 may be used alone, in conjunction with each other for redundancy and/or to avoid error due to froth/foam build-up at upper fluid surface boundaries of the contents of the thickener/clarifier.

The drive 17 may comprise a variable frequency drive (VFD) motor which receives one or more control signals 25d from the control system 24. Signals 25d may also pass from the drive 17 back to the control system 24, and these may incorporate information pertaining to operational parameters of the drive 17 (e.g., temperature, RPM, vibration, voltage, torque, current draw, etc.), without limitation. In addition, one or more control signals 25f may be delivered between control system 24 and valve 19. For example, a signal 25f may be delivered from the control system 24 to valve 19 to adjust (e.g., via opening or closing the valve 19) a back end exit flow of material leaving the centrifugal-type pump apparatus 36. If the RPM of the drive 17 is such that the centrifugal impeller 16 is experiencing 'dry run' conditions—or the fluid level within the weir box 12 is too low or empty, the valve 19 can be adjusted (e.g., to be more partially or fully closed) to reduce flow therethrough, the current to drive 17 may be reduced, and/or the depth of submergence 26 may be increased, in order to allow more diluent to be present within pump housing 9, whilst maintaining proper dilution of feed slurry within mixing chamber 5. The aforementioned changes may be made temporary (i.e., until dry run conditions are no longer detected, or operating conditions have improved or stabilized).

In some instances, it may be beneficial to choose to run the pump assembly 36 dry, for example, to the point where a portion of the centrifugal impeller 16 is exposed from submergence, in order to avoid surging conditions in the weir box 12. Decisions to run dry (i.e., in a "full flush regime") may be unique to a particular process and may depend on particular flow-requirements vs. the shape/size of the feed dilution apparatus 27 that can be accommodated into a particular thickener. The control system 24 thus may make run dry determinations as needed.

Control system 24 may comprise a processor (e.g., CPU, PLC), hardware, memory, operating system (OS), and an executable file containing software or code comprising an algorithm. Signals 25a-25f may be delivered from one or more components 17, 18, 19, 21, 22 of the feed dilution apparatus 27 to the control system 24 via known wired or wireless protocols. Signals 25a-25f received by the control system 24 may be interpreted by the processor, e.g., using the algorithm, in order to determine one or more optimal setting requirements for one or more of the various components 17, 18, 19, 21, 22 of the feed dilution apparatus 27. The algorithm may determine whether a current setting, input variable parameter, or configuration or orientation of a particular component 17, 18, 19, 21, 22 needs adjusting to obtain optimal performance of the feed dilution apparatus 27.

Based on received inputs (i.e., gathered from input control signals 25a-25f), the algorithm may determine an appropriate respective corrective action plan, and/or may identify one or more corrective measures to be made (if any) in relation to a proposed operational configuration of the feed dilution apparatus 27. To improve or maintain continued operation of the feed dilution apparatus 27, the processor may compare algorithm-recommended outputs against received inputs. If feed dilution apparatus 27 operation can be improved via one or more configuration modifications, the processor may deliver appropriate output control signals 25a-25f to one or more of the respective components 17, 18, 19, 21, 22, to change a configuration of the feed dilution apparatus 27 and improve performance of the feedwell assembly 1.

The feedwell assembly 1 and feed dilution apparatus 27 (including configurations of pump housing 9, centrifugal impeller 16, weir box 12, pump outlet 9e, diluent inlet 10, and other components thereof) described and illustrated herein are provided merely as examples to which the invention of the claims may be applied. The specification does not suggest that the invention of the claims is limited to or applies only to the particular devices or configurations shown and described herein.

Velocities of mixed infeed slurry and diluent entering the feedwell may be tailored for optimal flocculation. For example, flow velocities within feedwell inlet 4 and/or mixing chamber 5 may be in the range of approximately 0.5 m/s to 5 m/s, and more preferably in the range of approximately 1.5 m/s to 2.2 m/s, without limitation. Computational fluid dynamics (CFD) model data suggests that it may be possible to increase flocculent shear leaving the feedwell bottom opening 29 within this flow regime, and that lower velocities than the aforementioned velocity range may result in larger aggregates. However, by staying within the approximate 1.5 m/s to 2.2 m/s velocity range, sanding in the mix chamber 5 may be able to be mitigated or completely avoided, without limitation.

It should be understood that with lower feedwell entrance velocities, the loading rate may be relatively low, thus requiring a larger feedwell 3 to be able to function appropriately. However, the inventors anticipate that a feedwell 3 used in conjunction with the feed dilution apparatus 27 described and shown herein may be configured with larger entrances and/or a larger shelf, in order to keep the same downflow rates and feedwell 3 sizing, without limitation. In such embodiments, it may be preferable to slope the lower shelf 28 of the feedwell 3, in order to minimize potential for sanding buildup.

Turning now to FIGS. 11-16, in some embodiments, a number of stationary weir box baffles 30 may be provided within the weir box 12, for example, above the sidewall 12b. The baffles 30 may extend generally radially with respect to a center of the weir box 12, and may be confined to not extend radially past the spill lip, without limitation.

Figures 17, 18, 19:
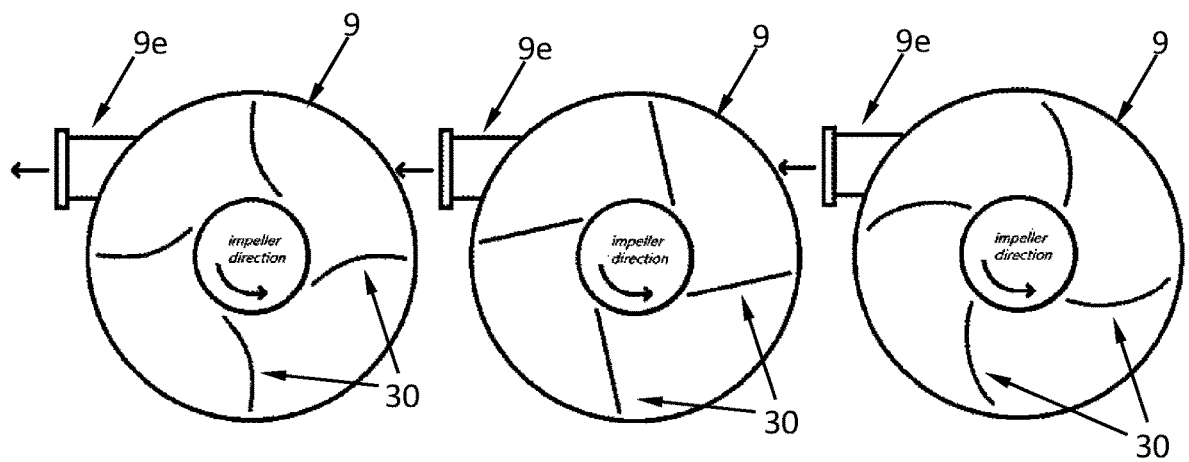
FIGS. 17-19 depict different baffle 30 arrangements that may assist with counteracting swirling from impeller 16 and/or shaft 15 rotation.

The baffles 30 may extend at an angle 34 with respect to a radial 35 extending from the center of the weir box 12 as depicted. This angle 34 may be zero degrees, or greater than or less than zero degrees. Thus, the baffles may extend non-orthogonal to a tangent of spill lip 12b or may be canted or tilted in any one or a plurality of the three axis dimensions, without limitation. The angle 34 may be optimized and/or configured to prime the rotational direction of fluids entering the channel defined by tube portion 12a. The baffles 30 may, thus, be configured to guide the water flow to enter the housing in a tangential direction as to prevent crowding of water at the inlet and/or to counteract swirling effects induced by rotation of shaft 15 and/or impeller 16, without limitation. FIGS. 17-19 depict some non-limiting examples of how baffles may be arranged at an angle to counteract swirling effects induced by rotation of shaft 15 and/or impeller 16.

In some embodiments, one or more of the baffles 30 may comprise one or more bends 31. These bends 31 may be useful for preventing splashing (e.g., by defining an integral "hood" in each baffle 30). These bends 31 may also provide work hardening in each baffle 30 to provide a stiffening or strengthening effect.

Figure 13:
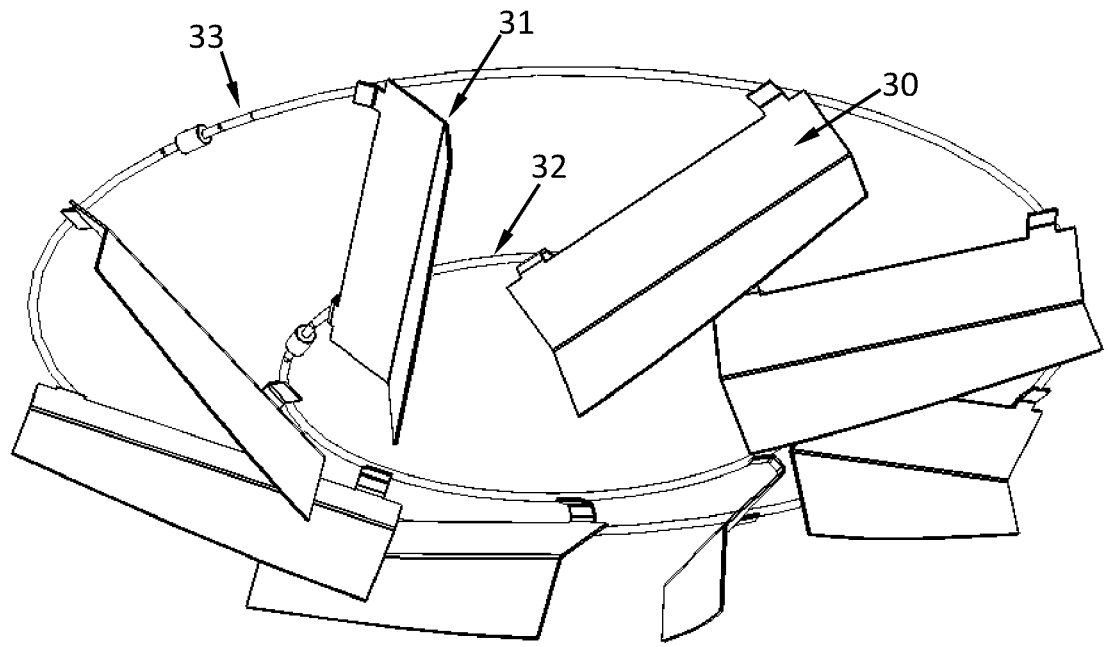

As shown most clearly in FIG. 13, all of the baffles 30 may comprise at least one bend 31, without limitation. Each bend 31 may be oriented along a length of the respective baffle 30 as shown, but one or more bends 31 may also be oriented along its width (not depicted) to wrap incoming flow with more effect. The baffles 30 may be substantially straight as shown, or may comprise a curved profile (not shown) similar to baffles 16b shown for the impeller 16, without limitation.

The weir box baffles 30 may be fastened (e.g., by bolting or welding) to the sidewall 12c portion of the weir box 12, preferably within the circumferential/peripheral confines of the spill lip 12b. In some anticipated embodiments, the baffles 30 may be supported or interconnected, e.g., via one or more rings, such as an inner support ring 32 and an outer support ring 33, as shown. The baffles 30 may be completely submerged (i.e., positioned below spill lip 12b), or they may be configured to protrude above the hydraulic fall line where clarified liquor moves thereover. For example, bends 31 shown may be above the liquid-air interface 20. Support structures 14 may be joined to one or more of the rings 32, 33. Or, the rings 32, 33 may, themselves, act as support structures 14, without limitation.

Figure 14:
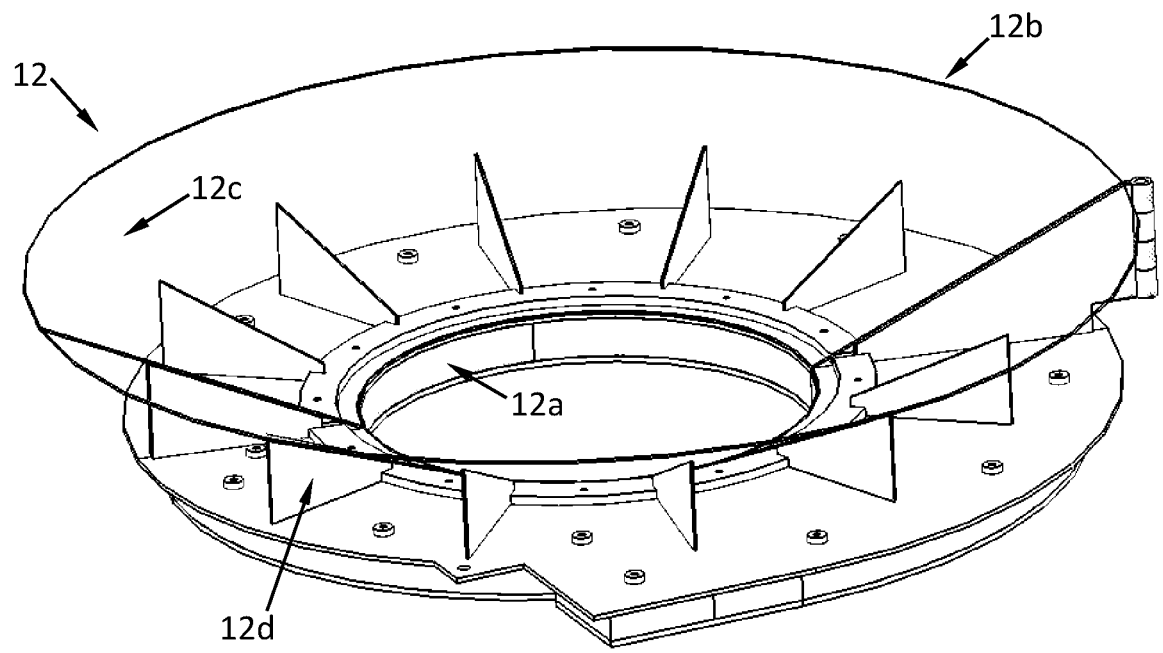

Turning now to FIG. 14, a number of support gussets 12d may be optionally provided to the weir box 12 to support the sidewall 12c and/or provide rigidity to the assembly and/or apparatus 27, without limitation. These gussets 12d may be used in combination with the aforementioned support structure(s) 14, and may, in some embodiments, form a portion or portion of a support structure(s) 14, without limitation. For embodiments where the support gussets 12d extend from the diluent inlet 10, support structures 14 extending upwardly from the weir box sidewall 12c as shown in FIGS. 1-5 may be rendered optional.

Figure 15:
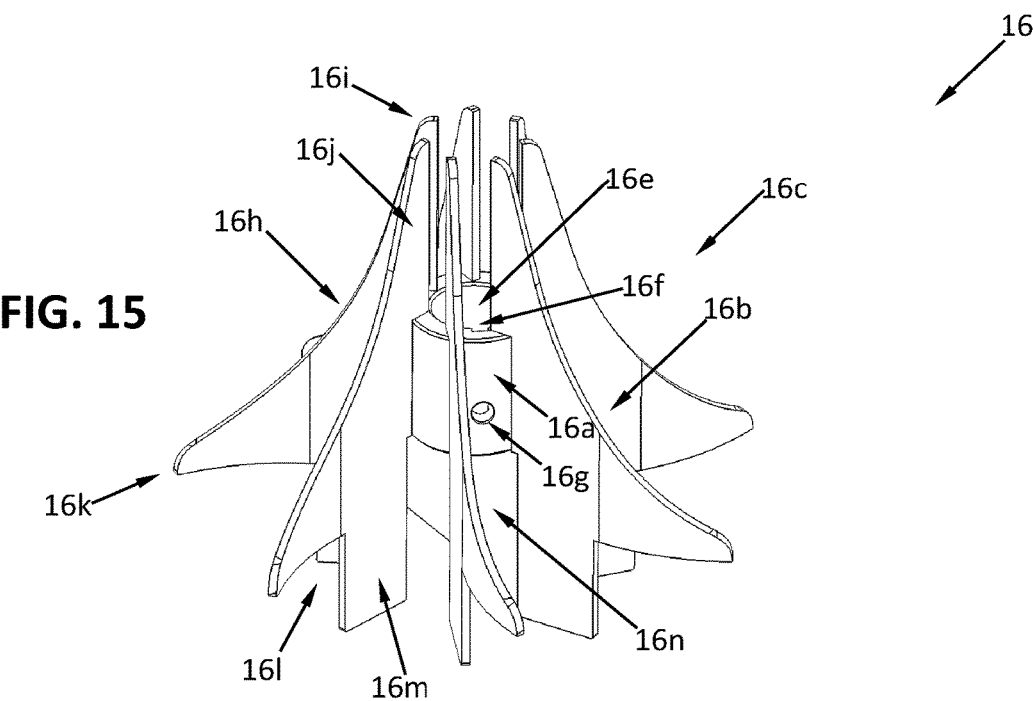
Figure 16:
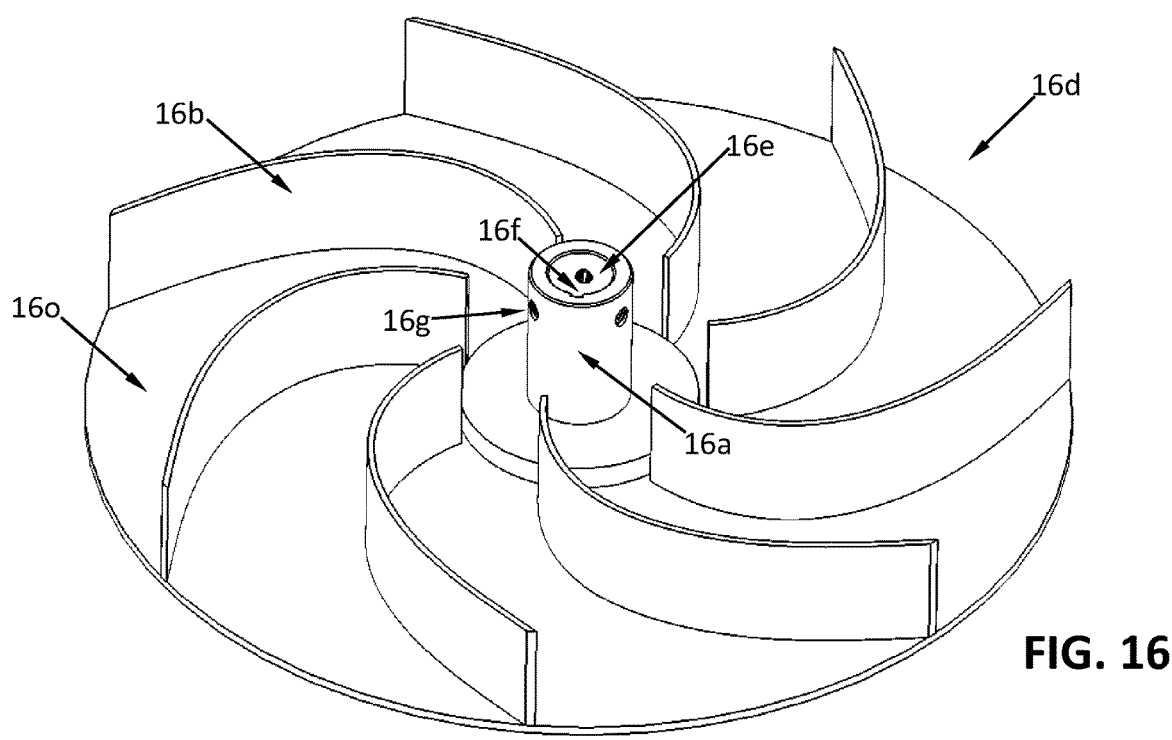

Turning now to FIGS. 15 and 16, in some embodiments, a centrifugal impeller 16 may comprise an upper impeller 16c and a lower impeller 16d. The two may be separable and defined as separate components as depicted, or they may be made and/or provided together as one single, homogenous, monolithic component. The upper portion 16c of the impeller 16 may have a hub 16a, as well as the lower 16d portion. Vanes 16b on the upper impeller 16c may have a different characteristic (e.g., profile, shape, and/or size) than vanes 16b on the lower impeller 16d as shown. The vanes 16b of each impeller section 16c, 16d may rest flush with each other to create a modular (i.e., 'two-piece') vane structure for the impeller 16.

A bore 16e may extend through the impeller 16 (e.g., through each hub 16a), and any number of driveshaft anti-rotation features 16f (e.g., spline, keyway) may be provided within a bore 16e. The features 16f may prevent relative rotational movement between the driveshaft 15 and rotor 16 when the driveshaft 15 is received by the rotor 16. These anti-rotation features 16f may also prevent the upper and lower impeller sections 16c, 16d from spinning relative to each other.

One or more driveshaft connection features 16g (e.g., set screw with threaded opening) may also be provided to secure (e.g., semi-permanently) to the driveshaft 15, whilst still allowing removal for replacement or maintenance of the pump 36.

As depicted, the upper portion 16c of the impeller 16 may comprise vanes 16b having a flared outer profile 16h. For example, the radially-outer edge portions of the vanes 16b may be curved, flared, outwardly-tapering, filleted, and/or bell-shaped, without limitation. This profile 16h may serve to bias or urge downwardly-in-flowing fluids (entering through 12a) in a radially-outwardly direction, towards a sidewall 9c of the pump housing 9.

In some embodiments, the upper impeller 16c may comprise a radially-inner upper end 16i where a presence of hub 16a is diminished so as to maximize the hydrodynamic effect of upper portions of vanes 16b. For example, as shown, upwardly-projecting finger portions 16j of vanes 16b may closely transition the flared outer profile 16h with outer surfaces of the driveshaft 15. It should be understood, however, that in alternative embodiments, hub 16*a* may rise and extend entirely up to or closely-adjacent to the radially-inner upper end 16*i*. It is envisaged that in such embodiments, the hub 16*a* may taper down to the driveshaft 15 outer diameter as it extends upwardly to the radially-inner upper end 16*i*, without limitation.

The depicted radially-outer tip 16*k* may define an outermost portion of the upper impeller 16*c* and may serve to transition the flared profile 16*h* to the vanes 16*b* of the lower section 16*d*. A cutout 16*l* defining a lower downwardly-depending projection 16*m* may be provided below the radially-outer tip 16*k*. A lower radially-Inner cavity 16*n* may receive a hub 16*a* of the lower impeller 16*d* as shown. A baseplate 160 of the lower impeller portion 16*d* may spin proximate the bottom surface 9*d* portion of the pump housing 9, and form a lower portion of the impeller 16, without limitation.

Exactly how high the vanes 16*b* may extend up the driveshaft 15 (e.g., the vertical location of the radially-inner end 16*i*) may be dependent on flowrate through 12*c*. At higher flowrates, it is envisaged that fingers 16*j*, upper portions of vanes 16*b*, and/or the radially-inward upper end 16*i* may extend higher up the driveshaft 15.

As depicted, the vanes 16*b* of upper 16*c* and lower 16*d* impellers may coincide with each other to collectively define a smooth vane surface. In this regard, two-piece fabrication of impeller 16 may be more easily performed, whilst reducing its hydrodynamic pumping effect. It should be understood that the upper and lower impeller parts 16*c*, 16*d* shown in FIGS. 15 & 16 could be made together as one homogenous, unitary, monolithic piece, without limitation. In such instances, the vanes 16*b* may extend upwardly from a baseplate 160 towards the radially-inner upper end 16*i* along the driveshaft 15.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art.

In this specification, the terms 'comprises', 'comprising', 'includes', 'including', 'has', 'features', 'exhibits', or similar terms are intended to mean a non-exclusive inclusion, such that a method, system or apparatus that comprises a list of elements does not include those elements solely, but may well include other elements not listed.

LIST OF REFERENCE IDENTIFIERS

1 Feedwell assembly
2 Support structure(s)
3 Feedwell
4 Feedwell inlet
5 Mixing chamber (i.e., mix conduit)
6 Feed inlet (to mixing chamber 5)
7 Slurry infeed conduit
8 Bridge structure
9 Pump housing (e.g., shroud)
9*a* Upper nesting tube portion
9*b* Top surface
9*c* Volute sidewall
9*d* Bottom surface
9*e* Pump outlet
9*f* Connecting flange
10 Diluent inlet (to mixing chamber 5)
10*a* Entrance portion
10*b* Main channel
10*c* Exit portion
11 Adjustable connection (between weir box 12 and pump housing 9)
12 Weir box
12*a* Lower nesting tube portion
12*b* Spill lip
12*b*' Spill lip (alternative)
12*b*'' Spill lip (alternative)
12*b*''' Spill lip (alternative)
12*b*'''' Spill lip (alternative)
12*c* Sidewall
12*c*' Sidewall (alternative)
12*c*'' Sidewall (alternative)
12*c*''' Sidewall (alternative)
12*c*'''' Sidewall (alternative)
12*c*''''' Sidewall (alternative)
12*c*'''''' Sidewall (alternative)
12*d* Support gusset(s)
13 Skimmer baffle
14 Support structure(s) (Weir box 12)
15 Driveshaft
15*a* Driven end
15*b* Drive end
16 Centrifugal impeller/rotor
16*a* Hub
16*b* Vane(s)
16*c* Upper impeller
16*d* Lower impeller
16*e* Bore
16*f* Driveshaft anti-rotation feature (e.g., spline, keyway)
16*g* Driveshaft connection feature (e.g., set screw with threaded opening)
16*h* Flared outer profile (e.g., curved, flared, outwardly-tapering, bell-shaped)
16*i* Radially-inner upper end
16*j* Upwardly-projecting fingers
16*k* Radially-outer tip
16*l* Cutout
16*m* Lower downwardly-depending projection
16*n* Lower radially-inner cavity
160 Baseplate
17 Drive (e.g., VFD motor w/optional reducer)
18 Actuator
19 Valve
20 Air-liquid interface
21 Ultrasonic level sensor (Air-liquid interface 20)
22 Mechanical level sensor (Air-liquid interface 20)
23 Float
24 Control system
25*a* Control signal(s) (Mechanical level sensor 22)
25*b* Control signal(s) (Ultrasonic level sensor)
25*c* Control signal(s) (Actuator 18)
25*d* Control signal(s) (Drive 17)
25*e* Control signal(s) (Actuator 18)

25f Control signal(s) (Valve 19)
26 Submergence depth (distance between air-liquid interface 20 and spill lip 12b)
27 Feed dilution apparatus
28 Feedwell shelf
29 Feedwell bottom opening
30 Weir box baffles
31 Bend
32 Inner support ring
33 Outer support ring
34 Angle
35 Radial
36 Centrifugal-type pump

What is claimed is:

1. A feedwell assembly (1) comprising a feedwell (3) and a feed dilution apparatus (27) for diluting infeed slurry with diluent prior to entering the feedwell (3), the feed dilution apparatus (27) comprising a mixing chamber (5) operably connected to a feedwell inlet (4), the mixing chamber (5) configured to receive slurry from a slurry infeed conduit (7) and combine the slurry with the diluent received from a diluent inlet (10), the feed dilution apparatus (27) comprising a centrifugal-type pump apparatus (36) having a centrifugal impeller (16) arranged within a pump housing (9), the pump housing (9) being arranged below a weir box (12), the weir box (12) having a spill lip (12b) arranged at an upper periphery of the weir box (12), wherein the spill lip (12b) is configured to be arranged below an air-liquid interface (20) during operation such that there is a depth of submergence (26) between the spill lip (12b) and the air-liquid interface (20);

the pump housing (9) comprising a pump outlet (9e) extending from a volute sidewall (9c) of the pump housing (9) and operably connected to and/or fluidly communicating with an entrance portion (10a) of the diluent inlet (10), the pump outlet (9e) being operatively connected to the mixing chamber (5) via the diluent inlet (10);

the pump outlet (9e) being located adjacent a radially-outermost sidewall (9c) portion of the pump housing (9);

wherein the feed dilution apparatus (27) is further configured for drawing froth/foam containing entrained solids and clarified liquor into the pump housing (9) and then out of the pump outlet (9e) when the centrifugal impeller (16) within the pump housing (9) turns; and to enable the froth/foam containing entrained solids and clarified liquor to spill over lip (12b) and enter the weir box (12), which in turn, feeds the centrifugal-type pump apparatus (36) below.

2. The feedwell assembly (1) according to claim 1, wherein an adjustable connection (11) is provided between the weir box (12) and the pump housing (9).

3. The feedwell assembly (1) according to claim 2, wherein the adjustable connection (11) comprises a telescoping connection between a lower nesting tube portion (12a) of the weir box (12) and an upper nesting tube portion (9a) extending from and above an upper surface (9b) of the pump housing (9).

4. The feedwell assembly (1) according to claim 3, wherein the feed dilution apparatus (27) further comprises at least one actuator (18) that is configured to move the lower nesting tube portion (12a) relative to the upper nesting tube portion (9a).

5. The feedwell assembly (1) according to claim 4, wherein the at least one actuator (18) is configured to move at least one support structure (14) connected to a portion the weir box (12).

6. The feedwell assembly (1) according to claim 1, wherein the spill lip (12b) is configured to move with respect to the pump housing (9) to change the depth of submergence (26).

7. The feedwell assembly (1) according to claim 1, wherein the feed dilution apparatus (27) is further characterised in that the pump outlet (9e) is positioned lower in elevation than the mixing chamber (5), the feedwell inlet (4), and/or the slurry infeed conduit (7).

8. The feedwell assembly (1) according to claim 1, wherein the pump outlet (9e) is operably connected to an entrance portion (10a) of the diluent inlet (10), and the mixing chamber (5) is operably connected to an exit portion (10c) of the diluent inlet (10), and a main channel (10b) extends between the entrance portion (10a) and the exit portion (10c) at an angle with respect to the air-liquid interface (20); a lower surface of the entrance portion (10a) being positioned below a lower surface of the exit portion (10c).

9. The feedwell assembly (1) according to claim 1, wherein the diluent inlet (10) is positioned below the slurry infeed conduit (7).

10. The feedwell assembly (1) according to claim 1, wherein a driveshaft (15) connects a drive (17) to the centrifugal impeller (16), the driveshaft (15) extending through a central portion of the weir box (12) and pump housing (9).

11. The feedwell assembly (1) according to claim 1, wherein the pump housing (9) has a closed bottom surface (9d) below the centrifugal impeller (16).

12. The feedwell assembly (1) according to claim 1, further comprising a valve (19) positioned between the pump housing (9) and the mixing chamber (5) to restrict the flow of liquids between the pump housing (9) and the mixing chamber (5).

13. The feedwell assembly (1) according to claim 1, wherein the weir box (12) includes one or more baffles (30).

14. The feedwell assembly (1) according to claim 11, wherein the one or more baffles (30) extend radially along a sidewall (12c) of the weir box (12).

15. The feedwell assembly (1) according to claim 12, wherein the one or more baffles (30) extend at an angle (34) with respect to a radial (35) from a central portion of the weir box (12).

16. The feedwell assembly (1) according to any one claim 1, wherein vanes (16b) of the centrifugal impeller (16) comprise a flared outer profile (16h).

17. A method of diluting slurry entering a feedwell (3) of a thickener/clarifier from a slurry infeed conduit (7) comprising the steps of:

providing the feedwell assembly (1) according to claim 1;
rotating the centrifugal impeller (16);
drawing clarified liquor and/or froth adjacent the air-liquid interface (20) over the spill lip (12b), and into the weir box (12) by virtue of said depth of submergence (26);
shearing the clarified liquor and/or froth within the weir box (12) and/or within the pump housing (9);
passing the sheared clarified liquor and/or froth to the mixing chamber (5);
combining the sheared clarified liquor and/or froth with the slurry in the mixing chamber (5); and, feeding the feedwell (3) with a mixture of the slurry and the sheared clarified liquor and/or froth.

18. A feed dilution apparatus (27) for diluting infeed slurry with diluent prior to entering a feedwell (3), the feed dilution apparatus (27) comprising a mixing chamber (5) operably connectable to a feedwell inlet (4), the mixing chamber (5) configured to receive slurry from a slurry infeed conduit (7) and combine the slurry with the diluent received from a diluent inlet (10), the feed dilution apparatus (27) comprising a centrifugal-type pump apparatus (36) having a centrifugal impeller (16) arranged within a pump housing (9), the pump housing (9) being arranged below a weir box (12), the weir box (120 having a spill lip (12b) arranged at an upper periphery of the weir box (12), wherein the spill lip (12b) is configured to be arranged below an air-liquid interface (20) during operation such that there is a depth of submergence (26) between the spill lip (12b) and the air-liquid interface (20);

the pump housing (9) comprising a pump outlet (9e) extending from a volute sidewall (9c) of the pump housing (9) and operably connected to and/or fluidly communicating with an entrance portion (10a) of the diluent inlet (10), the pump outlet (9e) being operatively connected to the mixing chamber (5) via the diluent inlet (10);

the pump outlet (9e) being located adjacent a radially-outermost sidewall (9c) portion of the pump housing (9);

wherein the feed dilution apparatus (27) is further configured for drawing froth/foam containing entrained solids and clarified liquor into the pump housing (9) and then out of the pump outlet (9e) when the centrifugal impeller (16) within the pump housing (9) turns; and to enable the froth/foam containing entrained solids and clarified liquor to spill over lip (12b) and enter the weir box (12), which in turn, feeds the centrifugal-type pump apparatus (360 below.

* * * * *